April 27, 1937. R. A. VASEY 2,078,746
METAL HEATING
Filed April 17, 1928 2 Sheets-Sheet 1
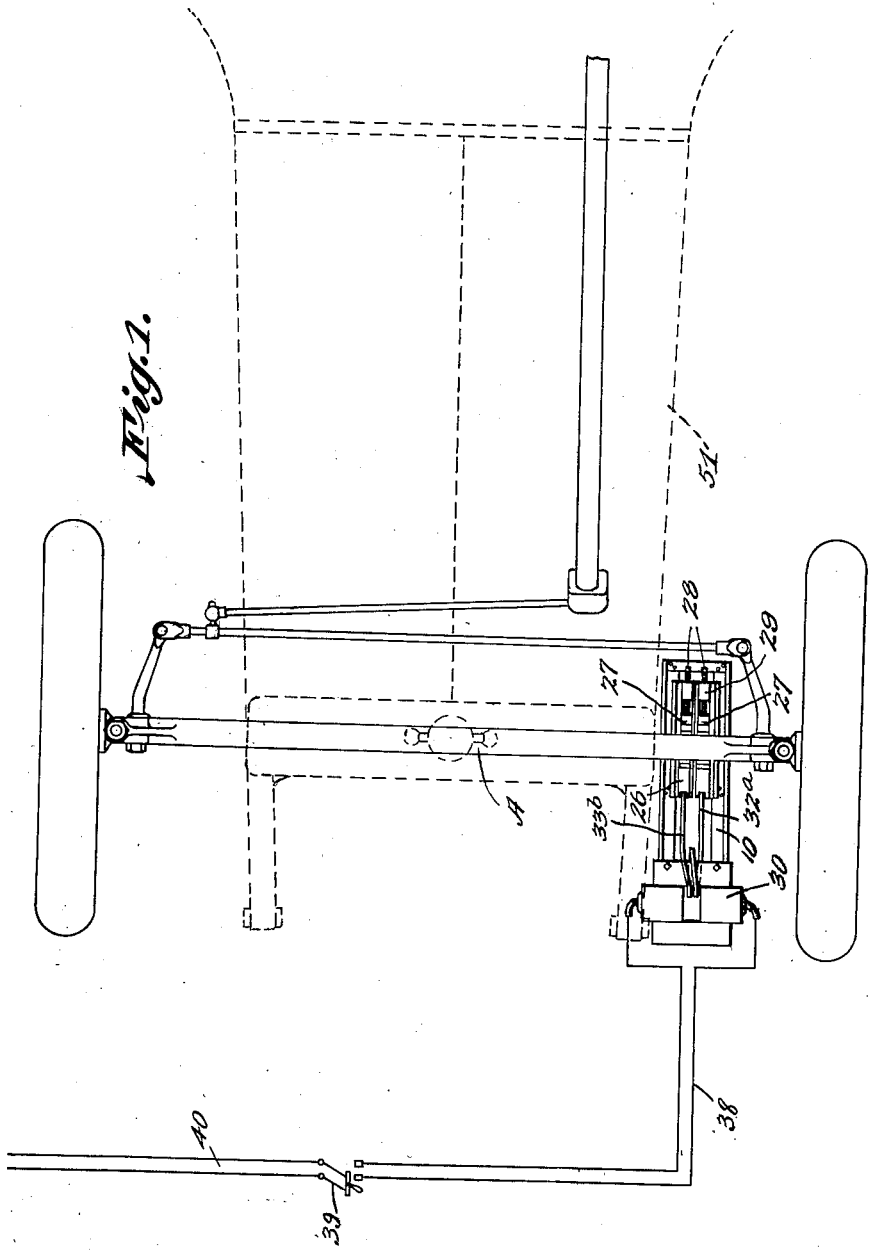

April 27, 1937.     R. A. VASEY     2,078,746
METAL HEATING
Filed April 17, 1928     2 Sheets-Sheet 2
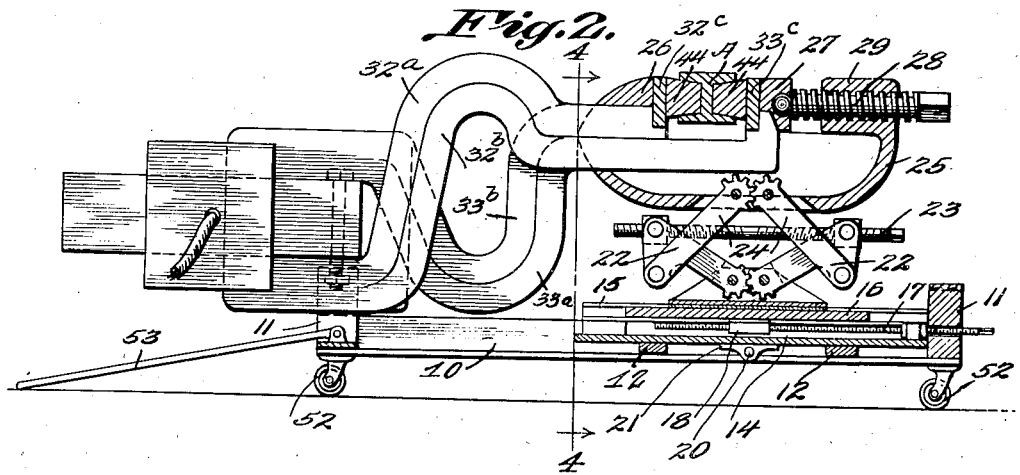
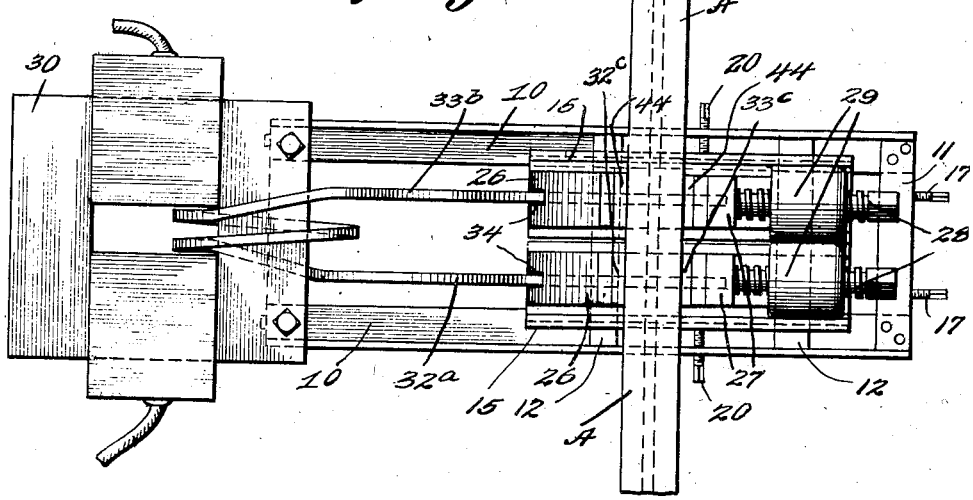
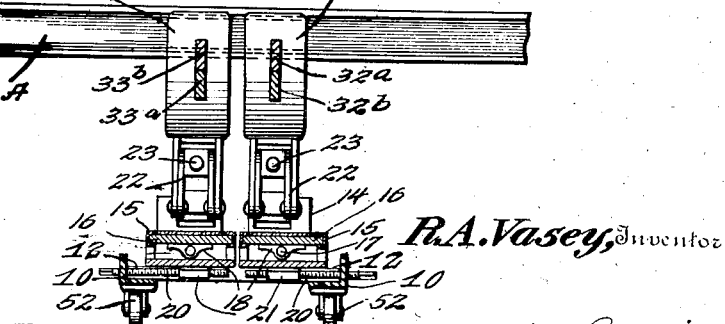
R. A. Vasey, Inventor
By H. H. Snelling, Attorney Patented Apr. 27, 1937

2,078,746

UNITED STATES PATENT OFFICE 2,078,746

METAL HEATING

Roland A. Vasey, Tucson, Ariz., assignor to Henry H. Snelling, Washington, D. C.

Application April 17, 1928, Serial No. 270,661

17 Claims. (Cl. 219—11)

This invention relates to the art of metal heating and has for its principal object the provision of means for conveniently and safely heating an automobile axle without the necessity of dismounting it from the vehicle.

Other objects of the invention are not so specifically directed to automobile axle bending but pertain quite generally to the art of metal heating in which the metal to be heated may not be carried to an appreciably elevated temperature without danger to its structure and strength.

At the present time it is quite general to remove an automobile axle from the vehicle whenever it is desired to bend it although attempts have been made to heat an axle in place by means of an acetylene torch but it has been universally recognized that this practice is exceedingly dangerous for the point of the torch carries the metal to a point high above the critical safe temperature and furthermore, and probably more important, the torch deposits a great amount of carbon to the hot metal which at this time is quite absorbent thus giving the metal a high carbon content which later will crystallize forming an accident hazard. As far as I know up to the time of my invention the only safe way to bend an automobile axle, since obviously cold bending is merely a make-shift, is to dismount the axle and warm it slowly in a furnace of the proper type.

With my invention however the axle can be left in place and I automatically preserve the metal from damage by placing in the circuit a fuse so to speak which will start to be destroyed at a temperature somewhat less than the dangerous temperature for the metal. A metallurgical engineer can readily provide an alloy with any chosen fusing point but I may, if desired, use a straight pyrometer instead, my only objection to this however being that the garage owner cannot then determine whether or not the mechanic in charge is careful to see that the metal is never heated too high. For sake of convenience I mount my entire unit on a truck so that it is not necessary to bring the automobile to a particular spot in the garage for treatment.

In the drawings:—

Figure 1 is a general plan view of my device as applied to an automobile axle, the body of the vehicle being shown in dotted lines.

Figure 2 is a side elevation partly in section.

Figure 3 is a plan view.

Figure 4 is a section taken on line 4—4 of Figure 2.

Figure 5 shows a modification.

The drawings illustrate the model which has been tried out and found satisfactory although obviously when the device is manufactured in quantity its general appearance will doubtless vary quite appreciably from that shown. As illustrated a truck is formed of a pair of angle irons 10 connected at their two ends by cross beams 11 and by intermediate transverse straps 12, the latter slidably supporting two independent bases or carriages 14, each of which carries a pair of guideways 15 to position a platform 16 independently movable forward and backward on the truck and carriage by means of a longitudinal screw 17 rotating freely in a slot in the rear end beam 11 and being threaded to a nut 18 secured to the center of the platform. A screw 20 has threaded connection in any desired manner with the adjacent carriage 14 for example thru the nut 21 so as to adjust the adjacent platform 16 transversely of the truck.

Mounted upon but insulated from each platform 16 (unless the platform is of wood as actually made) is a jack 22 here shown as of very familiar type in which the lifting screw 23 is threaded right and left having a nut on each side pivoted to the junction of the jack arms so that by drawing the two nuts together the jack is raised. Any type jack may be used but the jack illustrated has been found very convenient in practice, as all that is necessary is to remove the usual saddle of this commercial jack and pivot the interlocking ends of the bars or links 24 direct to a casting 25 forming a vise of which 26 is the fixed jaw and 27 is the movable jaw. A square threaded screw 28 passes thru an enlarged cylindrical boss 29 which is an integral part of the casting 25, having a ball and socket connection with the movable jaw 27 following ordinary practice, except that perhaps the fit is purposely a little looser to allow the jaw to fit the work a trifle the more readily.

The transformer 30 is bolted to the front transverse beam 11 and is of ordinary construction with the parts shown quite diagrammatically, as its specific form is immaterial, as a simple soft iron core type with the primary tapped so that a variable voltage of from say two to seven bolts may be had on the secondary which is built up of thin gage copper strips. In order to lessen the total weight the secondary of the particular machine illustrated is wrapped twice about the core but doubtless a single turn will be used on the commercial models. The cables of the secondary are halved as indicated by the numerals 32a, 32b, and 33a, 33b, one pair of halves passing through an elongated slot 34 in one of the castings 25 while the other part of halves passes thru a similar slot in the other casting 25. After passing thus to the interior of the somewhat hollow casting the leaves or strips of the secondary are welded to copper block electrodes 32c and 33c fastened respectively to the stationary jaw 26 and to the movable jaw 27, so that by clamping the four electrodes, two in each casting 25, against an axle, current will pass from one pair of electrodes 32c, 33c to the two electrodes in the other vise casting when the line is closed by means of the switch 39 which preferably is not on the truck or transformer but is located on a wall or other permanent part so that the line wires 40 may be in the usual metallic cable while the leads 38 may be flexible. While the circuit therefore may not be completed while standing at the work, the switch may readily be opened from such location as for example by a cord to the switch.

Quite an important feature of the invention has not yet been mentioned, this being the provision of automatic means to prevent overheating of the axle. In the preferred form a pyrometric block 44 is placed between the automobile axle and each electrode. For this particular purpose, since aluminum of reasonable commercial purity will melt at approximately 1220° F., I form slugs of this metal approximating fairly closely the contour of the axle and hence can be quite safe in heating the axle even though it is admittedly injurious to the steel to raise its temperature above 1250° F. When desired, the aluminum can be alloyed so as to secure any desired fusing point. In the modified form shown in Figure 5 the clamps are numbered 3 and 3a and between the two members I secure a pyrometer 49, but unless strict supervision is exercised one can never insure that the mechanic will not exceed the safe temperature unless perchance the pyrometer is made so as to register the maximum temperature which has been recorded. Therefore in order to be safe I much prefer the pyrometric blocks as it takes from the mechanic the power to overheat the metal being treated whether that be an automobile axle as in the specific embodiment shown or whether it be some totally different body not necessarily even metal. The invention contemplates the heating of any object that can be heated by the passage of electric current thru it and the interposition in the circuit of a fusible material of any kind that will give away in part at least before a chosen maximum temperature is reached in the treated material or will otherwise indicate the approach of the danger range of heat.

The operation of the device is as follows: the automobile indicated in dotted lines in Figure 1 and given the numeral 51, is moved to any convenient location in the garage and the truck which is mounted on casters 52 is moved by means of a handle 53 to a position approximately directly beneath the bend in the injured axle. The vises are now each independently raised by means of the jack screw 23 to the proper height. The aluminum slugs, four being required, are now placed against the axle which has previously been buffed quite clean throughout the entire area where the contact is to be made. At this point it is convenient to make critical adjustment of the position of the vise castings 25 by means of the longitudinally positioning screws 17 and possibly some slight change may be desired in the transverse positioning of the two clamps or vises, this being accomplished thru movement of one or both of the transverse screws 20.

When each clamp or vise is arranged in exactly the desired position the screw 28 is turned so as to compress the aluminum blocks against the axle. Since the relatively heavy screw 28 is capable of exerting a pressure of approximately ten tons the aluminum actually flows and forms itself into the exact shape of the axle making a most excellent contact and avoiding uneven distribution of the heat. The current is now turned on and the operator watches the aluminum critically in order that when incipient fusion is noted the current may be turned off. The clamps are now quickly released and lowered and the proper action then taken to correct the set of the axle, which may be due to accident or may possibly be due to a factory setting which is not altogether satisfactory for the crown of the roads in the territory over which the automobile is used. For example, if a slightly different caster is indicated this is obtained by giving the axle a slight twist with a large wrench placed either at or adjacent to the king pin. If the camber is slightly out in the usual manner this is corrected by pulling down on the axle at the spring by means of a hook and lever. It happens at times that the camber is in the other direction and under such circumstances the axle must be jacked up at the spring and a downward pull exerted on the wheel but in any event it has been found that practically all corrections can be made with a single heating of the axle without the need to dismount it. The distance apart of the jacks, and therefore of the pairs of electrodes, will be varied in accordance with the type of car, that is, with the size of the axle and the time and amount of current will likewise vary in accordance with the individual jobs. However in any ordinary case a working heat can be secured in a real short period, roughly from four to six minutes.

What I claim is:

1. The method of heating an axle in place in an automobile which comprises passing an electric current thru a portion of the axle while interposing in the circuit and in contact with the axle a fusible composition which will melt at a temperature below the temperature at which the axle will be injured.

2. The method of heating an automobile axle to prepare it for a bending or straightening operation which consists in applying two electrodes to the axle one at each side of the bend, passing an electric current thru the axle between the two electrodes while holding in the circuit between one electrode and the axle a fusible material which will visibly indicate to the operator the near approach of a temperature dangerous to the axle and which will melt before such temperature is reached.

3. The method of heating an axle of I-shaped cross section which consists in clamping a pair of transversely alined electrically conducting fusible compositions into contact with the web and with the inside surfaces of both flanges of the axle, clamping a similar pair of fusible compositions against the axle at a point spaced from the first pair in a similar manner, and passing a current through the axle from one pair fusible compositions to the other pair until said compositions begin to fuse.

4. A method of heating a body of metal to a predetermined temperature which comprises applying a source of heat to said body and interposing between the source of heat and the said body a composition having a fusing point at approximately the said predetermined temperature, whereby overheating of the body is prevented.

5. A method of heating a metal body to a predetermined temperature which comprises applying a source of heat to a localized area of the body, interposing between said body and said source of heat a composition having a melting point between the said predetermined temperature and the critical temperature of the metal body being heated, whereby overheating of the said metal body is prevented by the fusing of said interposed composition.

6. A method of heating steel rods which comprises applying heating electrodes to predetermined areas of the rod, interposing between the said electrodes and the rod a body of metal having a predetermined melting point below the critical temperature of a rod, and exerting pressure upon the said interposed metal to cause the same to flow around the rod to make intimate contact therewith.

7. The method of heating a steel rod which comprises applying heating electrodes to predetermined areas of the rod, interposing between the said electrodes and the rod a mass of metal having a melting point at approximately the bending temperature of the rod, and flowing the said interposed metal under pressure around the said rod to form intimate contact therewith.

8. The method of heating a steel object of irregular contour which comprises applying current carrying electrodes to predetermined areas of the object, placing spaced slugs of aluminum under said electrodes and against the object and flowing the aluminum under pressure to fit the object to form an intimate electrical and heat transfer contact therewith, and passing electrical current from one slug to the other thru the object.

9. In a device of the character described a wheeled truck, a transformer mounted on said truck, two clamps each independently movable on the truck both longitudinally and transversely, a pair of electrodes for each clamp, electrical connections between the electrodes and the secondary of the transformer, and means for independently raising each clamp and its electrodes.

10. A safe temperature indicator for use in metal working comprising a block of aluminum roughly fitting the contour of an automobile axle including the web and both adjacent flange faces.

11. An apparatus for heating metal rods which comprises the combination with a transformer of a heating unit comprising a plurality of electrodes adapted to engage the rod to be heated in alined pairs a screw for exerting pressure to clamp said electrodes to the rod, a jack for each pair of electrodes, each adjustable in three directions, and a common mounting for the transformer, the heating unit and the jacks adapted to move the entire apparatus into desired relation to the rod to be heated.

12. A metal heating device comprising in combination, a frame, a plurality of supports, means for independently moving either support longitudinally or if desired transversely of the frame and also if desired at right angles to such longitudinal and transverse movement so as to adjust the supports to a chosen position with respect to the work to be heated, clamping means carried by the supports adapted to engage the work at spaced points and means for causing heating current to flow from one clamping means thru a portion of the work to the other clamping means.

13. In the process of heating an automobile axle by means of an electrical current, the method of preventing overheating of predetermined areas of said axle which consists in placing in the path of the electric current and in heat transfer relation with the axle, a composition which will fuse and interrupt the current at a temperature of the axle below the temperature at which said axle will be injured.

14. The method of heating a metal body to a predetermined temperature for a bending or straightening operation which consists in applying spaced electrodes to the body one at each side of the bend, and interposing between one of said electrodes and the body a device comprising a body of metal adapted to fuse at a temperature below said predetermined temperature which will indicate to the operator the approach of the predetermined temperature and passing an electric current thru the metal body between the electrodes until said device fuses.

15. A method of heating a body to a predetermined temperature which comprises applying an electrode thereto which by a change of its physical properties will indicate when the said temperature is reached, deforming said electrode while in place to adapt it to the shape of the body to form a close electrical and heat transfer contact therewith, applying a second electrode to said body at a spaced point from said first electrode and passing current from one electrode to the other only until the physical properties of the first mentioned electrode indicate the predetermined temperature.

16. The method of heating a steel object of irregular contour which comprises placing a slug of aluminum against the object and flowing the aluminum under pressure to fit the irregular contours of the object to form an intimate electrical contact therewith, applying an electrode to the object at a point spaced from the aluminum and passing an electrical current from the slug to the electrode.

17. Means for conducting a current to a steel bar to be heated by said current, comprising an electrode composed of an aluminum alloy and having a contact face of substantially the same contour as the side of said bar, means for holding and pressing said electrode against the bar with force sufficient to cause the contacting surface thereof to flow whereby a better electrical contact is made, the melting point of said alloy being below 1240°, and terminal means on said last mentioned means for connection with an electrical conductor.

ROLAND A. VASEY.